(12) United States Patent
Biberstein et al.

(10) Patent No.: US 11,983,969 B2
(45) Date of Patent: May 14, 2024

(54) SYSTEMS AND METHODS FOR MODELING ELECTRIC VEHICLE TOWING

(71) Applicant: Ford Global Technologies, LLC, Dearborn, MI (US)

(72) Inventors: Erik Biberstein, Novi, MI (US); Stuart C. Salter, White Lake, MI (US); Justin Carmen Campanaro, Ferndale, MI (US); Katherine Howard-Cone, Canton, MI (US); Jacob Doan, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 659 days.

(21) Appl. No.: 17/159,599

(22) Filed: Jan. 27, 2021

(65) Prior Publication Data

US 2022/0237952 A1 Jul. 28, 2022

(51) Int. Cl.
*G07C 5/00* (2006.01)
*B60G 17/019* (2006.01)
(Continued)

(52) U.S. Cl.
CPC ........... *G07C 5/004* (2013.01); *B60G 17/019* (2013.01); *B60R 16/0236* (2013.01); *G01C 3/02* (2013.01); *G06N 3/04* (2013.01); *G06N 3/08* (2013.01); *G06T 7/13* (2017.01); *G06T 7/194* (2017.01); *G06T 7/521* (2017.01); *G07C 5/0825* (2013.01);
(Continued)

(58) Field of Classification Search
CPC .... G07C 5/004; G07C 5/0825; B60G 17/019; B60G 2400/60; B60G 2400/97; B60G 2401/14; B60G 2401/21; B60G 2500/30; G01C 3/02; G01C 21/3469; G01C 21/3484; G06N 3/04; G06N 3/08; G06N 20/00; G06T 7/13; G06T 7/194; G06T 7/521; G06T 2207/20081; G06T 2207/20084;
(Continued)

(56) References Cited

U.S. PATENT DOCUMENTS 5,649,064 A * 7/1997 Jorgensen ............... G06F 30/15
73/147
6,151,537 A * 11/2000 Gheordunescu .......... G01L 5/13
296/13
(Continued)

FOREIGN PATENT DOCUMENTS

DE 102017111530 A1 11/2017

OTHER PUBLICATIONS

D. Berjoza "Aerodynamic Characteristics of Cars With Trailers in Road Experiments" (May 2015) pp. 250-257.

*Primary Examiner* — Adam R Mott
*Assistant Examiner* — Matthew C Gammon
(74) *Attorney, Agent, or Firm* — Frank Lollo; Eversheds Sutherland (US) LLP (57) ABSTRACT

Systems and methods for modeling electric vehicle towing are disclosed herein. An example method includes determining that a trailer is connected to a vehicle, generating a surface mapping of the trailer based on output of a sensor assembly of the vehicle, predicting a drag coefficient of the trailer based on the surface mapping, estimating a drag force based on the drag coefficient and the surface mapping, calculating an estimated range for the vehicle based on the drag force, and displaying the estimated range on a human machine interface of the vehicle.

16 Claims, 4 Drawing Sheets

(51) Int. Cl.

| | |
|---|---|
| *B60R 16/023* | (2006.01) |
| *G01C 3/02* | (2006.01) |
| *G06N 3/04* | (2023.01) |
| *G06N 3/08* | (2023.01) |
| *G06T 7/13* | (2017.01) |
| *G06T 7/194* | (2017.01) |
| *G06T 7/521* | (2017.01) |
| *G07C 5/08* | (2006.01) |
| *H04N 13/20* | (2018.01) |

(52) U.S. Cl.
CPC ......... *H04N 13/20* (2018.05); *B60G 2400/60* (2013.01); *B60G 2400/97* (2013.01); *B60G 2401/14* (2013.01); *B60G 2401/21* (2013.01); *B60G 2500/30* (2013.01); *G06T 2207/20081* (2013.01); *G06T 2207/20084* (2013.01); *G06T 2207/30252* (2013.01)

(58) Field of Classification Search
CPC .......... G06T 2207/30252; H04N 13/20; H04N 23/90; G06F 30/15; G06F 30/27
See application file for complete search history.

(56) References Cited

U.S. PATENT DOCUMENTS

| | | | |
|---|---|---|---|
| 8,165,770 | B2 | 4/2012 | Getman et al. |
| 10,380,898 | B1 | 8/2019 | Schubert et al. |
| 2009/0271078 | A1* | 10/2009 | Dickinson ............ G06V 10/255 |
| | | | 701/51 |
| 2017/0083773 | A1 | 3/2017 | Greenwood et al. |
| 2017/0297563 | A1* | 10/2017 | Kava ................. B60W 50/0098 |
| 2018/0029597 | A1* | 2/2018 | Gage ..................... B60W 40/12 |
| 2019/0265726 | A1* | 8/2019 | Switkes ................... G05D 1/02 |
| 2020/0226850 | A1* | 7/2020 | Bower ..................... B60Q 9/00 |
| 2022/0115897 | A1* | 4/2022 | Ijaz ....................... H02J 7/1423 |
| 2022/0269232 | A1* | 8/2022 | Steffensen ............. F03D 7/046 |
| 2023/0019764 | A1* | 1/2023 | Bschaden ............. G01M 17/06 |

* cited by examiner

SYSTEMS AND METHODS FOR MODELING ELECTRIC VEHICLE TOWING

BACKGROUND

Battery electric vehicles (BEVs) are capable of towing heavy loads or trailers, just like internal combustion engine (ICE) vehicles. However, the degree to which range is affected while towing may be more significant in BEVs than ICE vehicles. The BEV charging infrastructure is also currently not as developed as gas refueling infrastructure. That is, charging stations are often more scarce, harder to locate, or further away than gas stations. BEV users may not understand the range capabilities of their vehicles under all use conditions, including towing trailers, so they could use assistance to plan ahead and avoid being stranded.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is generally directed to systems and methods for BEVs that allow for estimated range determinations when a BEV is towing a trailer, as well as methods to improve range by selectively adjusting vehicle and/or trailer parameters. These systems and methods may be used by electric vehicles to determine vehicle range while towing trailers by determining a drag coefficient of the trailer.

An example method includes using cameras (or other sensors) on the vehicle to detect if there is a connected trailer. If so, the cameras (or other sensors) use laser projections (or ultrasonic or other sensor feedback) to determine the distance between the vehicle and trailer. An onboard computer uses machine learning with camera images (and/or other sensor data) to map the trailer outline and surface. The surface mapping of the trailer may involve pattern recognition, such as recognizing the shape of the trailer outline/silhouette, recognizing shading around curvature, recognizing dark spaces and openings (such as slots, windows, and so forth), and/or recognizing discontinuities such as bolts on the surface. An onboard computer uses machine learning in conjunction with the trailer's surface mapping to predict the drag coefficient of the trailer. The onboard computer uses the drag coefficient and frontal area to estimate the drag force of the trailer. The drag force is input into a range estimation calculator, and then a driver is provided with an improved range estimation for the vehicle. In some cases, the drag information of the trailer may also be obtained using a transmitter tag, such as a Bluetooth Low Energy (BLE) tag, that is located on the trailer (for example, the tag may allow a previously-stored record including the drag information to be accessed).

The drag information of the trailer can be used as an input for an alteration to reduce the drag of the trailer. For example, the suspension can be raised or lowered to create a smooth airflow path between the vehicle and trailer based on the trailer outline/profile estimated from machine learning.

Illustrative Embodiments

Figure 1:
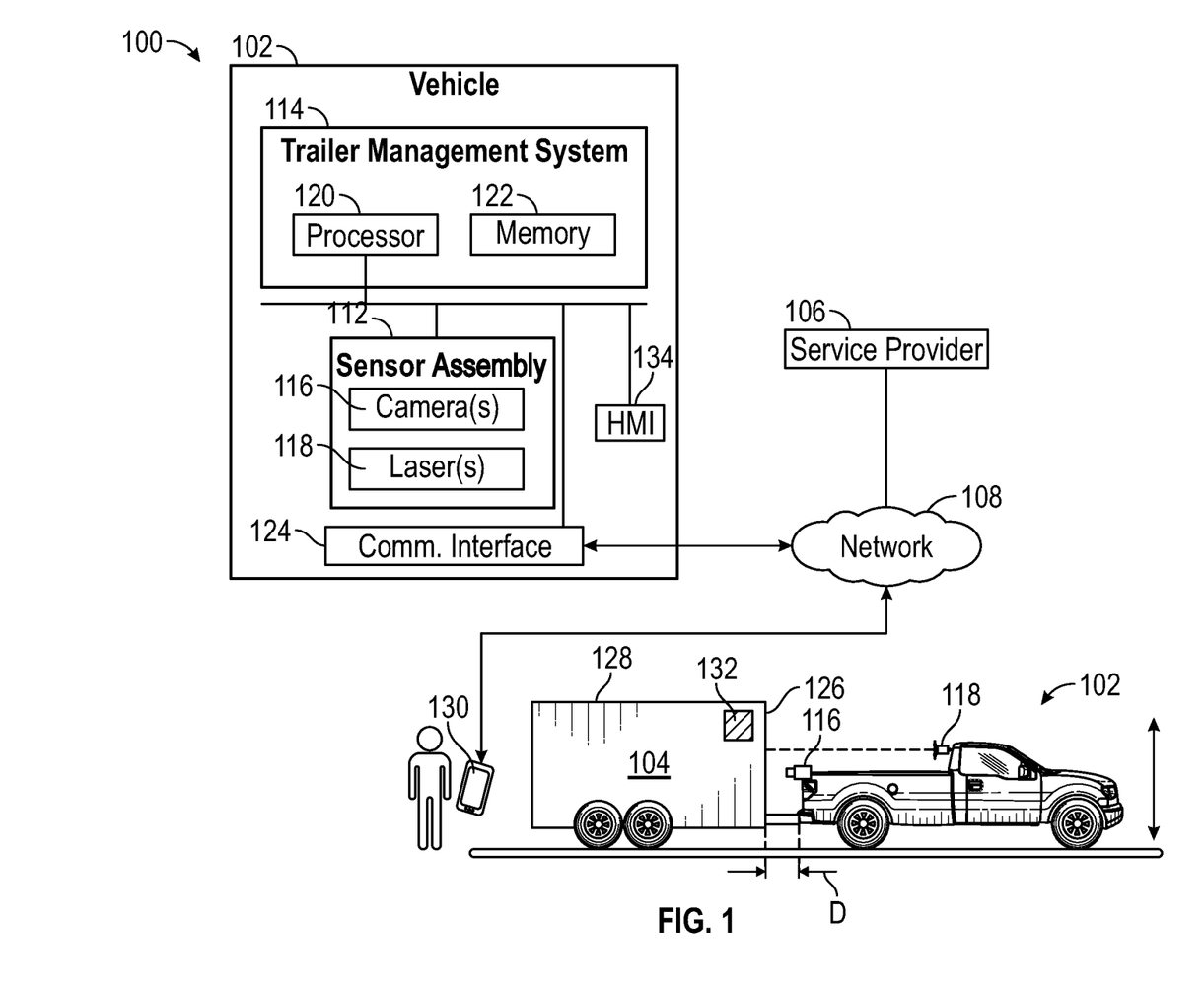
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The architecture 100 can include a vehicle 102 (can include a BEV, combustion, and/or hybrid vehicle) in combination with a trailer 104, as well as a service provider 106. Some or all of these components in the architecture 100 can communicate with one another using the network 108. The network 108 can include combinations of networks that enable the components in the architecture 100 to communicate with one another. The network 108 may include any one or a combination of multiple different types of networks, such as cable networks, the Internet, wireless networks, and other private and/or public networks. In some instances, the network 108 may include cellular, Wi-Fi, or Wi-Fi direct.

Generally, the vehicle 102 can comprise a sensor assembly 112 and a trailer management system 114. The sensor assembly 112 can comprise one or more cameras such as camera 116, as well as one or more lasers such as laser 118, or other sensors. The camera 116 can be fixed on the vehicle 102 and pointed in a direction towards the trailer 104 (e.g., behind the vehicle 102). The camera 116 can be configured to obtain images and/or video of the area behind the vehicle 102, which may include the trailer 104 when the trailer 104 is connected to the vehicle (or when the trailer 104 is visible to the camera 116). In some instances, the camera or cameras can include stereoscopic cameras or cameras capable of obtaining stereoscopic images of the trailer 104.

The laser 118 can emit points of laser light that are reflected to a sensor of the laser 118. Although described as a laser, the sensor 118 can be any sensor or combination of sensors. For example, the laser 118 can include any one or more sensors (including a combination of lasers or other sensors), such as ultrasonic, rear collision radar, LiDAR (Light Detection and Ranging), and so forth.

The trailer management system 114 can have a processor 120 and memory 122. The processor 120 executes instructions included in the memory 122 to perform functions or operations in accordance with the present disclosure. In one configuration, the trailer management system 114 can communicate over the network 108 using a communications interface 124.

The trailer management system 114 can be generally configured to utilize the output of the camera 116 and the laser 118 of the sensor assembly 112 to determine when the trailer 104 is attached to the vehicle 102, as well as a surface mapping of the trailer. The surface mapping can be created of a front surface 126 of the trailer 104, or as a complete mapping of each surface (such as a top surface 128) of the trailer 104 that can be measured with the camera 116 and the laser 118. The output of the camera 116 and the laser 118 can be evaluated by the trailer management system 114 using pattern recognition. For example, the trailer management system 114 can recognize a shape of the trailer outline/silhouette, shading around curvatures, dark spaces, and openings such as slots, windows, and so forth. The trailer management system 114 can recognize discontinuities such as bolts on a surface of the trailer 104.

The trailer management system 114 can also determine a distance D between the vehicle 102 and the trailer 104. The trailer management system 114 can create a physical projection of dots on the ground between vehicle 102 and the trailer 104 using the laser 118. The trailer management system 114 then use camera 116 to read dot color, spacing, or marking to interpret distance between the vehicle 102 and the trailer 104. For example, the trailer management system 114 may determine that does which appear to be closer together are further away, and vice versa. When the vehicle 102 includes multiple cameras, the trailer management system 114 can utilize multi-camera projection (similar to a bird's eye view while parking a vehicle) to determine the distance D between the vehicle 102 and the trailer 104. The distance could include a space between a rearmost part of the vehicle 102 and the trailer 104, or an average of distances between two or more parts of the vehicle and the trailer (such as a distance from a tailgate and a cab when the vehicle is a truck).

It will be understood that while images of the trailer and/or vehicle can be obtained from a camera that is onboard the vehicle, the trailer management system 114 can utilize images obtained from a mobile device 130 as well. For example, a user can obtain one or more images of the trailer 104. These images can be processed by the trailer management system 114 in lieu of, or in combination with, images obtained by the camera 116. Furthermore, while the camera 116 can obtain images of the trailer 104, the mobile device 130 can obtain images of both the vehicle 102 and the trailer 104, in connected and/or disconnected states. When the trailer is connected to the vehicle 102 and the mobile device 130 obtains an image of the vehicle and trailer, this image can be processed by the trailer management system 114 to determine a distance between the vehicle 102 and the trailer 104.

The trailer management system 114 can implement machine learning (ML) or artificial intelligence to process images obtained by the camera 116. In one example, the trailer management system 114 can utilize ML to detect contours and/or edges of the trailer 104. The trailer management system 114 can employ canny edge detection in some instances. The trailer management system 114 can also perform background subtraction to eliminate elements of the image(s) that are not trailer 104. The ML utilized by the trailer management system 114 can include a neural network that is configured to classify pixels as either background (such as road/sky) or as portions of the trailer 104. A fixed camera perspective allows the calculation of a front surface of the trailer based on a pixel count of trailer contour. The ML process can be used to generate an example surface mapping of the trailer 104.

In more detail, the ML used to estimate the coefficient of drag ($C_{drag}$) and frontal area (A) of the trailer 104 based on exterior surface mapping of the front surface 126, for example. The ML can calculate the drag force as $F_{drag} = C_{drag} * A * \rho v^2 / 2$, were $\rho$ is the density of air and v is the velocity of the trailer. A lumped quantity, $L_D$ ($C_{drag}$, A), could be determined experimentally from baseline interpolations, to compute the drag force using the machine learning of a surface mapping. Experiments can be conducted with various types of trailers (exterior surface mappings). These results can be preloaded in order to populate baseline look up air-resistance tables available to the trailer management system 114 or customers at large.

As an alternative embodiment to estimate air resistance for a customer, the trailer management system 114 (or the service provider 106) can implement computational fluid dynamics calculations to dynamically model the real-time flow of air around the surface mapped trailer. Estimated air resistance can subsequently be fed into range-estimate calculators in some use cases. Estimated air resistance can be displayed on a human machine interface 134 of the vehicle 102, such as an infotainment system or heads up display. Range calculators implemented by the trailer management system 114 can also consider factors such as high voltage (HV) battery state of charge (SOC), learning driving behaviors, planned driving routes or destinations, and road conditions—just to name a few. It will be understood that the inclusion of air resistance may improve the accuracy of the BEV range predictions under all driving conditions, including when towing a trailer.

Figure 2:
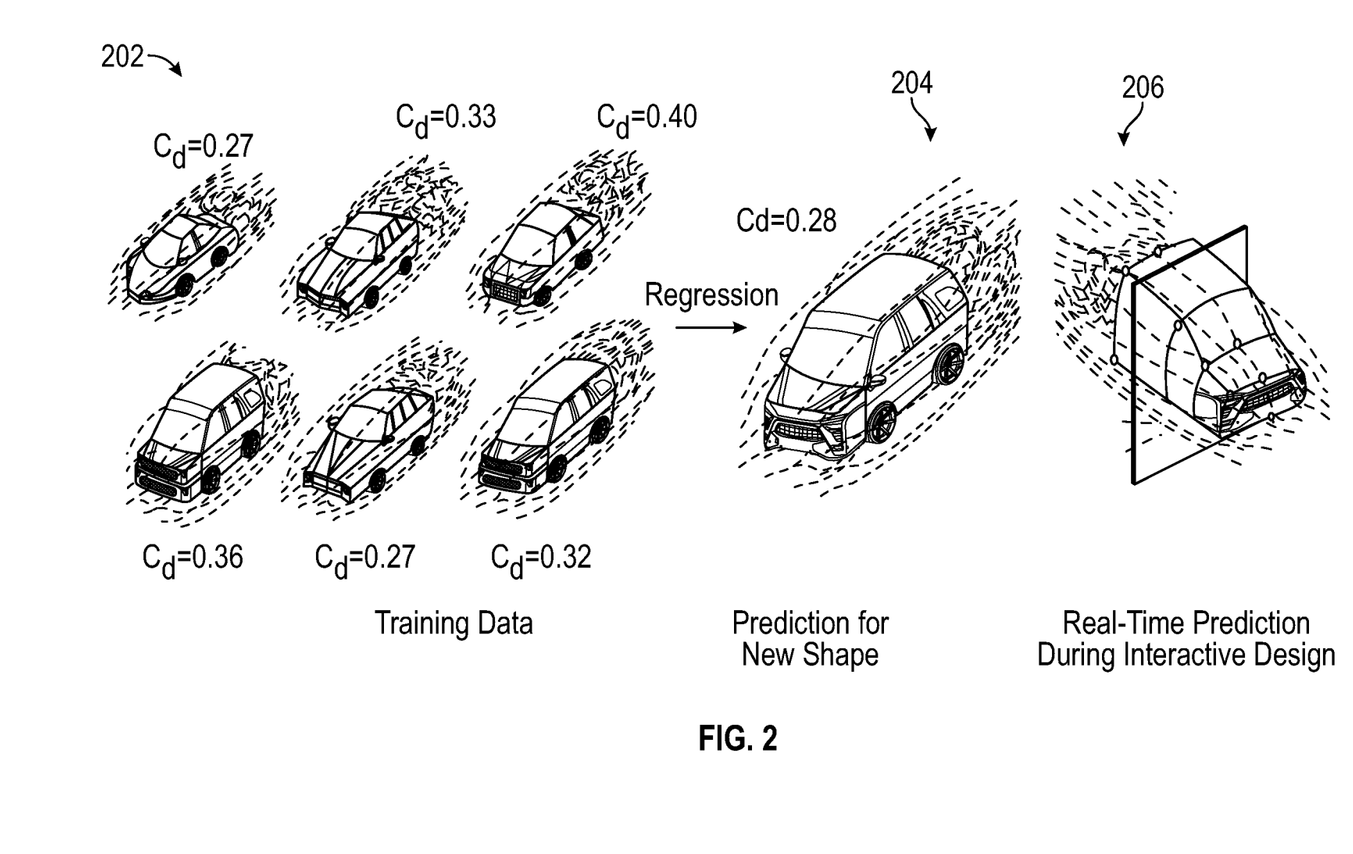
FIG. 2 depicts an example surface mapping/coefficient modeling process.

Referring now to FIGS. 1 and 2 collectively, once the surface mapping of the trailer has been completed, the trailer management system 114 can utilize the surface mapping to determine or estimate a drag coefficient for the trailer 104. The trailer management system 114 can utilize the ML to estimate the drag coefficient. For example, training data of trailer profiles 202 and their associated drag coefficients can be used to train a model to predict drag coefficient(s) based on trailer surface qualities. An example set of training data for various vehicle surface mappings (training data of trailer profiles 202) and drag coefficients can be compared to a surface mapping 204 of the vehicle 102 to provide a real-time prediction model 206. In one use case, a regression analysis is performed using the ML to predict the performance of the surface mapping 204 of the vehicle 102. The real-time prediction model 206 can be used to map actual vehicle operating data against the surface mapping 204, such as vehicle speed, wind, road grade, and so forth.

The trailer management system 114 can convert the drag coefficient into drag force estimation(s) as the vehicle 102 tows the trailer 104. Again, vehicle operating data such as vehicle speed and/or wind speed can be used by the trailer management system 114 to convert the drag coefficient into drag force estimation(s). The drag force estimation(s) can be used to calculate an estimated range for the vehicle 102. The estimated range can be determined using the drag force estimation(s) and any vehicle operating data, along with a current battery (or fuel) level for the vehicle 102. In some instances, additional factors can be used to determine estimated range such as topographical data. For example, if the vehicle 102 is traveling according to a navigation route, the topography along the route can be determined. The topography can affect how efficiently power is used by the vehicle 102 due to increases and/or decreases in road grade related to climbing and descending. The use of vehicle operating data enables the determination of more accurate range-estimates (e.g., distance-to-empty calculation) based on current conditions (such as rain, wind, temperature, traffic, and so forth) to enhance the customer experience and confidence vehicle performance and reliability.

The trailer management system 114 can transmit the surface mapping, the drag coefficient and/or the drag force estimation(s) to the service provider 106 for storage. In some instances, these data are stored along with the make and/or model of the trailer 104. These data can also be stored at the vehicle level.

The surface mappings of a trailer can also be used to determine the loading of the trailer. For example, if the trailer has an open bed (e.g., not enclosed), images can be obtained of the trailer. The mapping in this instance is not necessarily of the trailer alone, but also of contents or items loaded onto the trailer. The trailer management system 114 can obtain and process an image of the trailer at a first point in time (such as when the trailer is unloaded or only partially loaded), and use that image as a baseline. When the trailer is loaded with items, a second image or set of images can be obtained to determine a loading of the trailer. Again, the loading of the trailer can impact airflow as the trailer is towed. Thus, having an accurate surface mapping of the trailer in both loaded and unloaded states can enable more accurate airflow and range estimates.

The trailer management system 114 allows for experimental/empirical determination of trailer air resistance in view of various driving style (how one or more drivers operate the vehicle) and the creation of a database of specific permutations of trailers/drivers/vehicles. The trailer management system 114 can also evaluate prevailing winds (based on up-to-date, predicted, or real-time weather) can also be factored into air resistance estimations which impact range-estimates, also referred to as distance-to-empty calculations.

Thus, rather than having to calculate these data in real-time, these data can be downloaded from the service provider 106. Thus, the surface mapping of the trailer may not need to be created directly but can be determined from scanning a tag 132 on the trailer 104. The tag 132 can embed or link to data stored at the service provider 106 that includes a drag coefficient for the trailer.

The trailer management system 114 can execute one or more responses in view of the range-estimate calculated using the drag force(s) for the trailer. The trailer management system 114 can, for example, selectively adjust a vehicle ride height for an expected route, vehicle speed, and/or trailer loading. These data can be factored into trailer air resistance estimation(s) as discussed above. The trailer management system 114 can selectively raise or lower air suspension to create a smoother airflow path between vehicle 102 and trailer 104 based on the surface mapping. Thus, the improvement in vehicle range when towing can be proportional to an improvement in airflow over the vehicle and/or the trailer caused by selective adjustment of the vehicle ride height. In some instances, adjustments in ride height can be based on the surface mapping of the trailer 104. The trailer management system 114 can used the ML to model the changes in ride height to determine if such changes improve airflow. As noted above, the trailer management system 114 can also factor driver-specific behaviors into the air resistance determinations, such as acceleration profile, how often a driver exceeds the speed limit, and so forth.

Figure 3:
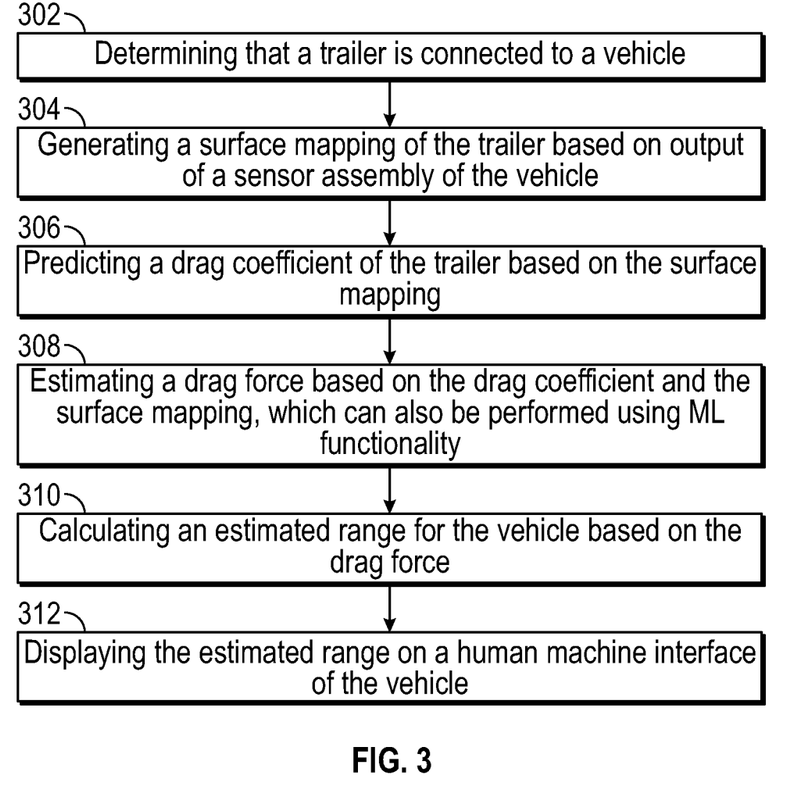
FIG. 3 is a flowchart of an example method for estimating range for a towing vehicle.

FIG. 3 is a flowchart of an example method. The method can include a step 302 of determining that a trailer is connected to a vehicle. This can include, for example, processing images obtained from a vehicle to identify the trailer as being present. In other examples, the trailer can be sensed through connection with a connector that electrically couples the trailer to the vehicle.

The method can include a step 304 of generating a surface mapping of the trailer based on output of a sensor assembly of the vehicle. The surface mapping can be a three-dimensional stereoscopic representation of a front surface of the trailer. Alternatively, the surface mapping can be a three-dimensional stereoscopic representation of various surfaces (or all visible surfaces) of the trailer. The surface mapping process can include using ML, such as a neural network to detect and classify pixels that can be interpreted as contours and edges of the front surface (or other surfaces) of the trailer using images obtained a camera, as well as subtract background pixels of the images.

Next, the method can include a step 306 of predicting a drag coefficient of the trailer based on the surface mapping. Again, this process can be accomplished using ML to train a model against a set of surface mappings and drag coefficients for similar trailers. The method further includes a step 308 of estimating a drag force based on the drag coefficient and the surface mapping, which can also be performed using ML functionality. For example, the drag coefficient can be estimated using machine learning using training data for trailer profiles that have similar surface mappings to the surface mapping of the trailer The method includes a step 310 of calculating an estimated range for the vehicle based on the drag force, as well as a step 312 of displaying the estimated range on a human machine interface of the vehicle. In some instances, the surface mapping, the drag coefficient, and the drag force to a service provider along with a make and/or model of the trailer. This allows the analysis of the trailer to be recorded and made downloadable.

Figure 4:
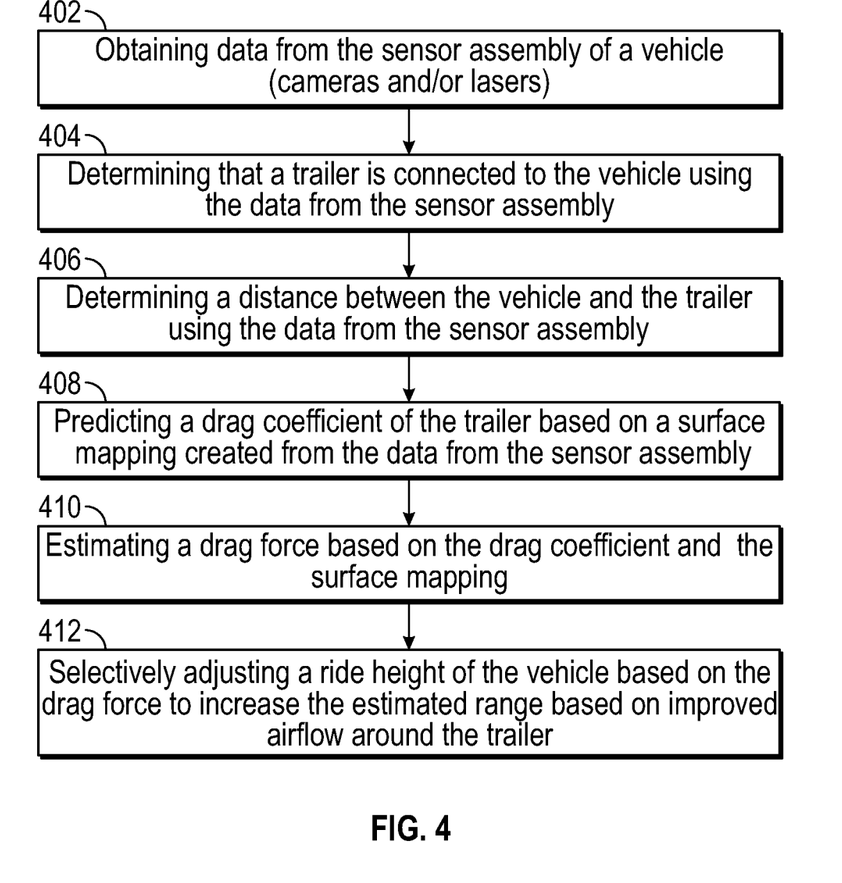
FIG. 4 is a flowchart of another example method for estimating range for a towing vehicle.

FIG. 4 is a flowchart of another example method. The method can include a step 402 of obtaining data from the sensor assembly of a vehicle. The vehicle may be connected to a trailer. The sensor assembly can include one or more cameras and one or more lasers. The data of the sensor assembly can include any combination of images, video, and laser data.

Next, the method can include a step 404 of determining that a trailer is connected to the vehicle using the data from the sensor assembly. For example, the images obtained by the camera can be processed to identify a trailer shape. The method can include a step 406 of determining a distance between the vehicle and the trailer using the data from the sensor assembly. The distance between the vehicle and the trailer can have an impact on the airflow over the vehicle and the trailer when they are connected to one another and the trailer is being towed.

The method can further include a process of calculating an estimated range for the vehicle while towing the trailer by a step 408 of predicting a drag coefficient of the trailer based on a surface mapping created from the data from the sensor assembly, as well as a step 410 of estimating a drag force based on the drag coefficient and the surface mapping. It will be understood that estimated range is related to the drag force.

In some instances, the method can include remediating or response steps to improve the estimated range for the towing vehicle. For example, the method can include a step 412 of selectively adjusting a ride height of the vehicle based on the drag force to increase the estimated range based on improved airflow around the trailer. Other selectively adjustable attributes of the trailer can also be utilized. For example, if the tow hitch or receiver can be selectively lengthened, a distance between the vehicle and the trailer can be increased or decreased to adjust the airflow profile when the trailer is being towed. Trailer loading assessments based on surface mappings (disclosed supra) can be used to selectively adjust trailer brake gain settings through a towing system of the vehicle.

Also, when the vehicle is a BEV, a response can include selectively adjusting a navigation route for the vehicle or creating a navigation route based on the estimated range. For example, if the towing vehicle is on a route to a destination, but the modeling indicates that the estimated range would not allow the towing vehicle to reach its destination in view of its current power available (e.g., battery state of charge), the navigation route can be updated to include a stop at a charging station, even if such charging station is off-route. The modeling and estimated range calculations disclosed herein can be used to pre-plan routes based on predicted weather, navigation parameters, and driver behaviors—just to name a few.

In the above disclosure, reference has been made to the accompanying drawings, which form apart hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that stores computer-executable instructions are computer storage media (devices). Computer-readable media that carry computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid-state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   determining that a trailer is connected to a vehicle;
   generating, based on output of a sensor assembly, a surface mapping of the trailer, wherein the surface mapping is a three-dimensional, stereoscopic-based representation of at least one of the trailer or a front surface of the trailer;
   predicting, based on the surface mapping, a drag coefficient of the trailer;
   estimating, based on the drag coefficient and the surface mapping, a drag force;
   calculating, based on the drag force, an estimated range for the vehicle; and
   selectively adjusting a ride height of the vehicle based on the drag force to increase the estimated range based on improved airflow around the trailer.

2. The method according to claim 1, further comprising determining a distance between the vehicle and the trailer using a laser sensor, wherein the laser sensor is part of the sensor assembly.

3. The method according to claim 1, wherein the surface mapping comprises:
   detecting contours and edges of one or more surfaces of the trailer using images obtained by the sensor assembly; and
   subtracting background pixels of the images.

4. The method according to claim 3, wherein the background pixels are determined using a neural network to classify pixels of the images.

5. The method according to claim 1, further comprising determining a loading of the trailer using the surface mapping, the loading being indicative of items loaded onto the trailer.

6. The method according to claim 1, further comprising transmitting the surface mapping, the drag coefficient, and the drag force to a service provider along with a make and/or model of the trailer.

7. The method according to claim 1, wherein the drag coefficient is estimated using machine learning based on training data for trailers that have similar surface mappings to the surface mapping of the trailer.

8. The method according to claim 1, wherein the estimated range is further determined using any combination of vehicle velocity, acceleration, and prevailing headwinds.

9. A system, comprising:
   a processor; and
   memory for storing instructions, the processor executing the instructions to:
      determine that a trailer is connected to a vehicle;
      detect contours and edges of a front surface of the trailer based on images obtained using a camera;
      subtract background pixels of the images;
      generate a surface mapping of the trailer based on output of a sensor assembly of the vehicle;
      predict a drag coefficient of the trailer based on the surface mapping;
      estimate a drag force based on the drag coefficient and the surface mapping;
      calculate an estimated range for the vehicle based on the drag force; and
      selectively adjusting a ride height of the vehicle based on the drag force to increase the estimated range based on improved airflow around the trailer.

10. The system according to claim 9, further comprising determining a distance between the vehicle and the trailer using a laser sensor, the laser sensor being one of the sensor assembly of the vehicle.

11. The system according to claim 9, wherein the surface mapping is a three-dimensional, stereoscopic-based representation of a front surface or a three-dimensional stereoscopic-based representation of the trailer.

12. The system according to claim 11, wherein the background pixels are determined using a neural network to classify pixels of the images.

13. A vehicle, comprising:
   a sensor assembly comprising a camera and a laser; and
   a trailer management system, comprising a processor and memory, the processor executing instructions stored in the memory to:
      obtain data from the sensor assembly;
      determine that a trailer is connected to the vehicle using the data from the sensor assembly;
      determine a distance between the vehicle and the trailer using the data from the sensor assembly;
      calculate an estimated range for the vehicle while towing the trailer by:
         predicting a drag coefficient of the trailer based on a surface mapping created from the data from the sensor assembly; and
         estimating a drag force based on the drag coefficient and the surface mapping, wherein the estimated range is related to the drag force; and selectively adjust a ride height of the vehicle to increase the estimated range.

14. The vehicle according to claim 13, wherein the processor is configured to implement a neural network to classify pixels of images obtained from the camera, wherein contours and edges of a front surface of the trailer are determined and background pixels are removed.

15. The vehicle according to claim 13, wherein the processor is configured to create the surface mapping using a projection of dots created by the laser.

16. The vehicle according to claim 15, wherein the processor is configured to determine a loading of the trailer using the surface mapping, the loading being indicative of items loaded onto the trailer.

* * * * *